UNITED STATES PATENT OFFICE.

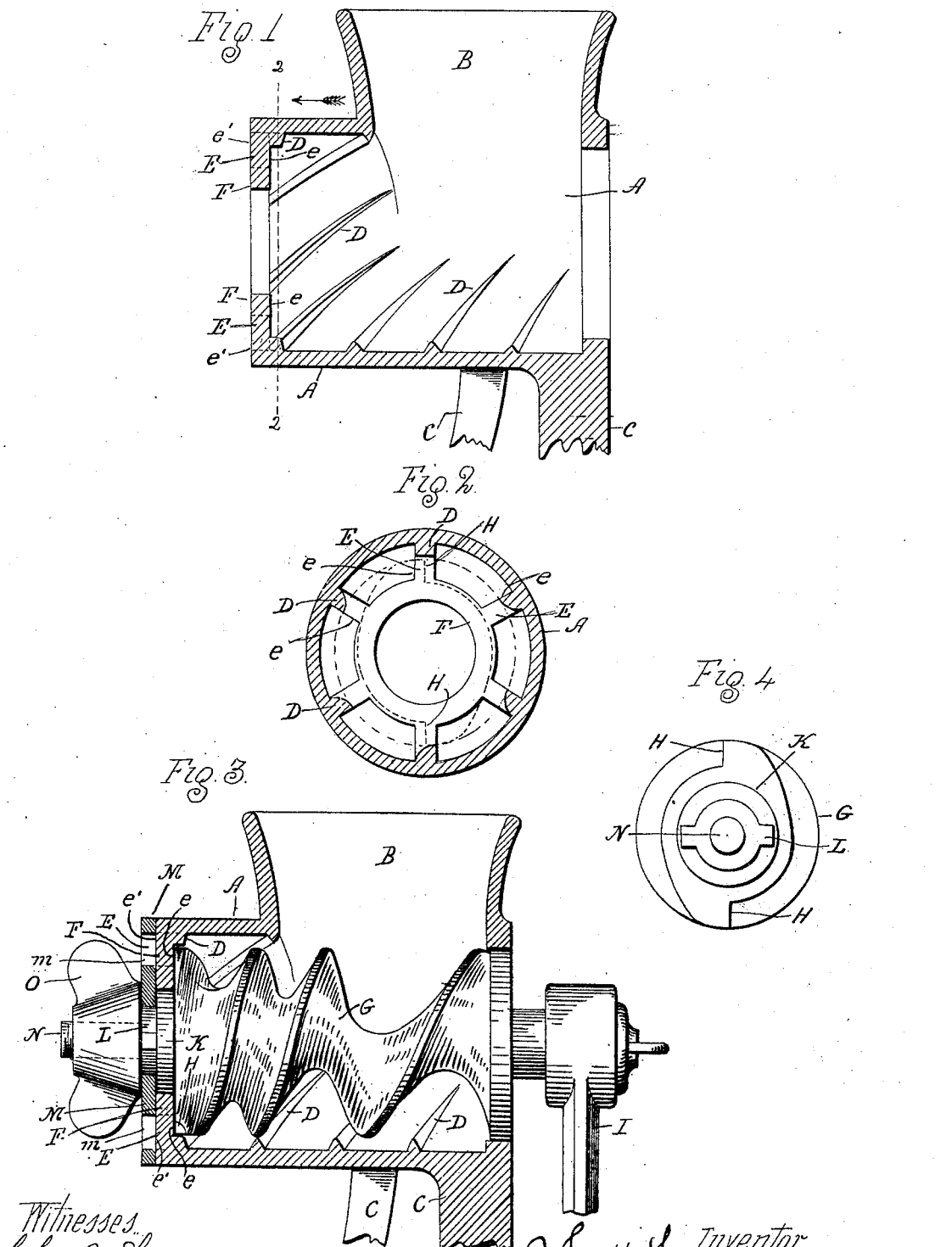

JOHN H. SHAW, OF NEW HAVEN, CONNECTICUT, ASSIGNOR TO SARGENT AND COMPANY, OF NEW HAVEN, CONNECTICUT, A CORPORATION OF CONNECTICUT.

FOOD-CHOPPER.

No. 833,422.  Specification of Letters Patent.  Patented Oct. 16, 1906.

Application filed January 30, 1901. Serial No. 45,325.

*To all whom it may concern:*

Be it known that I, JOHN H. SHAW, of the city and county of New Haven, State of Connecticut, have invented a new and useful Improvement in Food-Choppers, of which the following is a full, clear, and exact description when taken in connection with the accompanying drawings, which form a part thereof, and in which—

Figure 1 represents a central longitudinal section through the horizontal cylindrical casing of the chopper; Fig. 2, a transverse vertical section on lines 2 2 of Fig. 1; Fig. 3, a view similar to Fig. 1, showing in addition the screw-like forcer and cutters at the forward end thereof; and Fig. 4, an end view of the forcer and blades thereof.

In all figures similar letters of reference represent like parts.

This invention relates to food-choppers; and it consists in the novel relation between the feeding-ribs within the horizontal cylindrical casing and the cutting-arms at the forward end of the casing, as set forth in the construction and combination of parts described and claimed hereinafter, whereby a continuous free passage for the meat or other food operated upon is obtained through the cylindrical casing and preliminary cutters to the outer cutters along the principal lines of movement or channels between the ribs.

The invention is shown applied to a food-chopper of the type described in the United States Patent No. 623,839 granted to me on the 25th day of April, 1899, to which reference may be made for a more detailed description of some of the parts.

Referring to the drawings, the parts designated by the letter A represent the horizontal cylindrical casing through which the food is forced after being fed into the hopper B, extending upward from the casing.

C represents a portion of the legs or standard for supporting the casing.

D represents spiral feeding-ribs projecting inwardly from the interior surface of the casing, forming channels between them, along which the food may be forced, and E represents radial cutting-arms formed integral with the forward end of the casing and the inner ends of which terminate in a bearing-ring F, concentric with the casing A. Each cutting-arm E projects inwardly from the forward end of one of the feeding-ribs D, so that each of the ribs terminates in a cutting-arm, leaving the channel between the feeding-ribs unobstructed from end to end.

G represents the screw-like forcer for forcing the meat along the channels between the ribs. The forcer G terminates in blades or knife-edges H at its forward end, which form with the inner faces of the cutting-arms the preliminary cutters or shears of the chopper, by which at least a partial cutting or severing is produced in the meat.

As shown in Figs. 1, 2, and 3, the inner faces or operative surfaces $e$ of the cutting-arms E are limited by the inward projection of the feeding-ribs and are therefore shorter than the outer faces $e'$ of the arms, which extend from the bearing-ring to the inner surface of the casing. The forcer G and knives H are of substantially the same diameter and are rotated by the handle I within the feeding-ribs in the casing. The diameter of the forcer and knives is as much less than the internal diameter of the casing as the feeding-ribs project inwardly from the internal surface of the casing, as shown in Fig. 2. The knives H therefore, as shown in dotted lines in Fig. 2, upon their rotation come in contact with substantially the entire inner face or operative surface $e$ of each of the cutting-arms, but do not extend entirely across the channels between the feeding-ribs D and arms E. At the forward end of the forcer beyond the knives H is an axial bearing K, adapted to fit and rotate within the bearing-ring F. Forward of the bearing K is a mounting L for the rotary perforated disk or outside cutter M, which may be of a construction similar to that shown in my former patent, already alluded to, and which therefore needs no detailed description herein. The forcer finally terminates in a screw-threaded portion N for the reception of a nut O, adapted to bind on the cutter M and hold the parts together. As shown in Fig. 3, the perforations $m$ of the outside cutter M may extend radially to the farther end of the outside operative surfaces $e'$ of the arms E, and therefore extend across the entire channels between the ribs. By this construction there is no obstruction to the passage of the meat within the channels between the ribs until the outside cutter is reached, except so far as the knives H in their revolution pass across the inner portions of the channels and tend to sever the meat in contact with the inner faces *e* of the arms E.

Having now described my invention, which may vary in its details without departing from the spirit thereof, what I claim, and desire to secure by Letters Patent, is—

In a food-chopper, the combination with a substantially cylindrical casing, of continuous spirally-arranged feeding-ribs within said casing extending to the outlet therefrom and terminating each in a cutting-arm extending laterally of the casing, said cutting-arms being of a width no greater than the width of the ribs, whereby a plurality of continuous unobstructed passages are formed between the ribs and arms to the exterior of the casing, and a screw-like forcer arranged within the casing and provided at one end with a blade or blades arranged to coöperate with the inner faces of said cutting-arms.

In witness whereof I have hereunto set my hand this 24th day of January, 1901.

JOHN H. SHAW.

Witnesses:
WM. H. KIRSCHNER,
ALICE A. WILSON.